United States Patent [19]

Gulick, Jr.

[11] 4,011,564
[45] Mar. 8, 1977

[54] PHASE MODULATED MONOPULSE SYSTEM

[75] Inventor: Joseph F. Gulick, Jr., Clarksville, Md.

[73] Assignee: The United States of America as represented by the Secretary of the Navy, Washington, D.C.

[22] Filed: July 7, 1966

[21] Appl. No.: 564,519

[52] U.S. Cl. ............................................. 343/16 M
[51] Int. Cl.² ......................................... G01S 9/22
[58] Field of Search ............... 343/16, 16 SD, 17.5, 343/16 M

[56] References Cited

UNITED STATES PATENTS

| | | | |
|---|---|---|---|
| 3,153,234 | 10/1964 | Begeman et al. | 343/16 |
| 3,162,851 | 12/1964 | Kamen et al. | 343/16 |
| 3,185,982 | 5/1965 | Case, Jr. et al. | 343/16 |

Primary Examiner—Malcolm F. Hubler
Attorney, Agent, or Firm—R. Sciascia; R. Beers; S. Sheinbein

[57] ABSTRACT

There is disclosed a monopulse radar system that eliminates scan modulated jamming and which scans returning radar signals at filters rather than antennas and converts the signals to frequency modulated information rather than amplitude modulated information. The frequency modulated information is then detected.

8 Claims, 3 Drawing Figures

INVENTOR
*JOSEPH F. GULICK, Jr.*

BY
ATTORNEY
AGENT

PHASE MODULATED MONOPULSE SYSTEM

The present invention relates to a monopulse radar receiver and more in particular to a monopulse receiver for continuous wave radar wherein the error modulated carrier signals are added to a received sum signal to produce a phase modulated composite signal.

An object of the present invention is to immunize a monopulse continuous wave radar receiver system from jamming.

Another object of the present invention is to provide for narrowband filtering of a monopulse radar receiver.

A further object of the present invention is to provide for narrowband doppler tracking.

Another object of the present invention is to provide for phase modulation of the pointing error of a radar receiver seeker.

Other objects, advantages and novel features of the invention will become apparent from the following detailed description of the invention when considered in conjunction with the accompanying drawings wherein.

Figure 1:
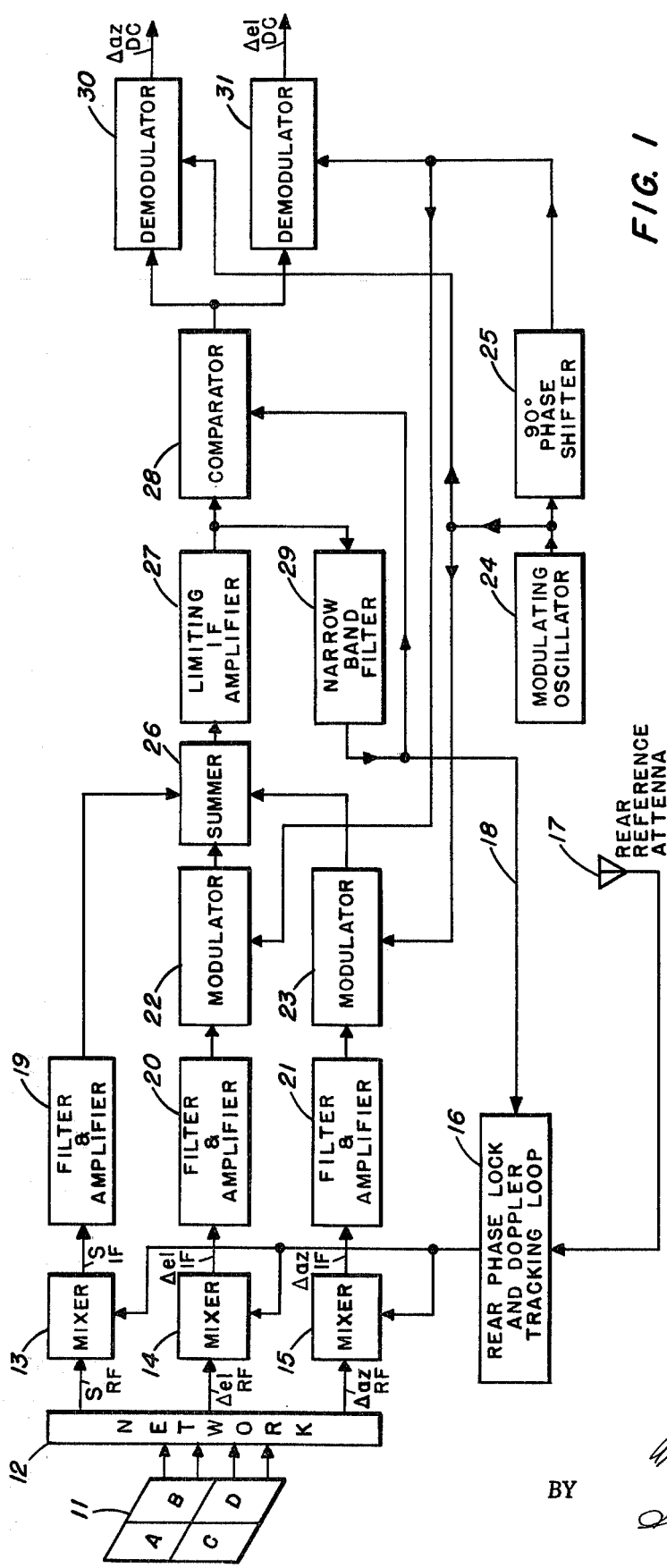
FIG. 1 is a block diagram of the phase modulated monopulse receiver of the present invention.

Referring now to FIG. 1, the microwave radar monopulse receiving system of the present invention is shown. The system has a conventional non-squinted monopulse four quadrant antenna 11, the quadrants being represented by A, B, C and D. The antenna 11 is mounted on gimals which is well known in conventional systems. Microwave radar signals from a target are received at each of the quadrants A, B, C and D of the horn 11 and are in turn fed to a network 12. Since the horn has a non-squinted receiving array, the amplitude of the signals received on the various quadrants will remain constant with respect to each other, but will have time differential phase shift. The network operates on the received signals at each quadrant to form a sum signal, S, which is the addition of signals in each quadrant A, B, C and D. Two difference or error signals of the signals received on the quadrants of the horn A, B, C and D are formed by subtracting the signals received in the lower two quadrants from the upper two quadrants and the signals received in the left two quadrants from the right two quadrants. Consequently, the elevation pointing error $\Delta\,e1$ is equal to the received signals of the quadrants processed by the network 12 in the following manner: $(A+B) - (C+D)$. Furthermore, the processing of the signals on the quadrants as follows represents the azimuth pointing error, $\Delta\,az$.

The $\Delta\,e1$ signal out of the network 12 is a microwave radio frequency signal whose amplitude varies according to the amount of time phase differential between the signals received on the upper two quadrants A and B and from the lower two quadrants, C and D. Or stating it differently, the amplitude of the $\Delta\,e1$ signal would indicate the amount the target signal was above or below the antenna axis in elevation. The sign of the $\Delta\,e1$ signal would indicate, being either plus or minus, whether the target was respectively above or below the antenna axis. The amplitude and sign indicates angular deviation of the target from the bore sight of the antenna. Futhermore, the sign of the $\Delta\,e1$ sign would indicate whether the $\Delta\,e1$ signal was $+90°$ or $-90°$ in phase from the sum signal S. Similarly, $\Delta\,az$ signal out of the network 12 is an RF signal whose amplitude varies according to the amount of time phase differential between the RF signals received on the right two quadrants, A and C from left two quadrants B and D. The amplitude of the $\Delta\,az$ signal indicates the amount the target signal was to the right or left of the antenna axis in azimuth. Similarly, the sign of the difference signal $\Delta\,az$ indicates that the target is to the right if positive and to the left if negative.

Figure 2:
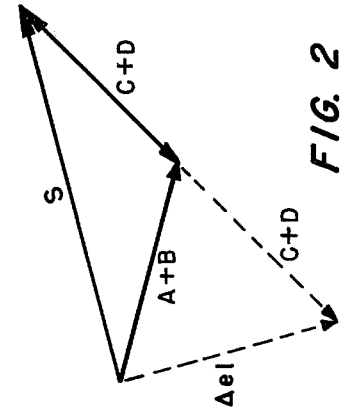
FIG. 2 is a vector diagram representing various RF signals received useful in explaining the operation of FIG. 1.

The vector of the signals for the elevation error, the $\Delta\,e1$ signal, is shown by FIG. 2. It can be proved by geometry that if the vectors A, B, C and D representing the signals on quadrants of the antenna have equal magnitudes, then $\Delta\,e1$ and S are at right angles. This logic would be the same for figuring out the relationship between azimuth error and the sum signal S. Each of the signals from the network 12, S, $\Delta\,e1$ and $\Delta\,az$ feed into their respective mixers 13, 14 and 15. To the mixers a signal from the rear phase lock and doppler tracking loop 16 is heterodyned to produce an intermediate frequency from the rear phase lock and doppler tracking loop 16 is developed by receiving at the rear reference antenna 17 the radar transmitted signal or the illuminated signal which is mixed with a signal from a local oscillator incorporated in loop 16 so that the signal from the rear phase and doppler tracking loop 16 fed to the mixers 13, 14 and 15 always produces a signal from these mixers at the intermediate frequency of 10 megacycles. The local oscillator of the rear phase lock and doppler tracking loop 16 is controlled by a feedback signal applied on line 18 indicative of the doppler signal contained within the received signal on antenna 11. This is done so that the signal applied to the mixers from the loop 16 will be compensated for the doppler frequency shift of the received signal on antenna 11 and to maintain the signal from the mixers 13, 14 and 15 within the middle of the intermediate frequency bandwidth.

Each of the signals from mixers 13, 14 and 15 at the intermediate frequency still represent the sum and the difference information developed by network 12. The intermediate frequency signals are applied respectively to narrow band crystal filters and amplifiers 19, 20 and 21. The narrow band filters eliminate or filter out any signals near the intermediate frequency due to the sidebands on the received RF signal at the antenna. With this arrangement, the signals from the mixers are selected to stay within a one kilocycle bandwidth at the intermediate frequency.

The $\Delta\,e1$ and $\Delta\,az$ signals after being amplified feed respectively into the modulators 22 and 23 which are supplied with a modulating signal of 5 kilocycles from modulating oscillator 24. The $\Delta\,az$ signal from filter and amplifier 21 is modulated by the oscillator signal to produce a double sideband suppressed carrier modulation at the output of modulator 23. Similarly, the signal from oscillator 24 is shifted $90°$ by phase shifter 25 and then fed to modulator 22 to produce a double sideband carrier modulation of the $\Delta\,e1$ signal from filter and amplifier 20. The reason for $90°$ phase shift in the modulating signal is to keep the two signals $\Delta\,e1$ and $az$ separable or identifiable.

Figure 3:
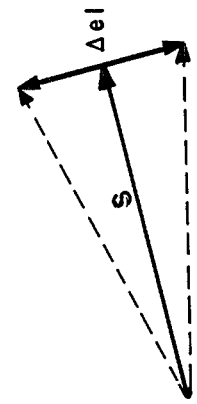
FIG. 3 is a vector diagram representing IF signals useful in explaining the operation of FIG. 1.

The elevation and azimuth difference channel signals from modulators 22 and 23 are suppressed carrier modulated in quadrature and are added to the sum signal from filter and amplifier 19 in summer 26. The addition of a modulated difference channel signal IF, either $\Delta e1$ or $\Delta az$ to a sum signal S would produce a signal represented by the dotted vector of FIG. 3 varying in phase from the sum signal S. Thus the addition of the two signals would produce a phase modulated signal with the amplitude of the phase modulation in proportion to the error or the time phase differential of the particular difference channel. Since the modulated $\Delta e1$ signal is 90° phase shifted from the modulated $\Delta az$ signal, the summation in summer 26 with sum signal, S, produces a composite signal. The phase modulated composite signal contains seeker pointing error where the amplitude of the modulation represents the magnitude of the seeker pointing error and the phase of the modulation with respect to the modulating oscillator indicates the direction of the error. The composite signal consists of the sum signal and sidebands at the modulating frequencies $\Delta e1$ and $\Delta az$ which contain the pointing error information. The phase modulated composite signal from the summer is fed to a limiting intermediate frequency amplifier 27. The composite signal is amplified and limited in amplifier 27 without the loss of any error information since the input composite signal is phase modulated as opposed to a conventional amplitude modulation.

The amplified and limited composite signal at the intermediate frequency from amplifier 27 is fed both to a comparator 28 and a narrow band filter 29. The narrow band filter 29 removes the sidebands from the composite signal and provides the pure sum signal S at IF comparator 28 phase shifted 90° from the sum signal in the composite signal. The filter 29 also feeds the sum signal to the loop 16 for doppler tracking.

Since the pure sum signal has a 90° phase shift from the sum signal in the composite signal which is the other input signal to comparator 28, the output from comparator 28 is a signal at the frequency of the oscillator 24 with the amplitude and phase representing the pointing error of the seeker or antenna 11. Thus the output signal of comparator 28 represents the polar coordinates of the error similar to the output of a conventional conical scan receiver. The operation of the comparator 28 eliminates the IF signal from the sum signal part of the composite signal and subtracts from the sidebands of suppressed carrier modulated signals in quadrature the IF part thereof leaving signals at the modulating frequence of oscillator 24.

Demodulators 30 and 31 are connected each to the comparator 28 and to oscillator 24 and phase shifter 25, respectively. The output signal of comparator 28 is compared with the modulating signal of oscillator 24 in demodulator 30 and with the modulating signal phase shifted 90° of shifter 25 in demodulator 31 to produce from each demodulator varying DC signal representing the azimuth pointing error and the elevation pointing error of the target with respect to the axis of the antenna 11. Thus the demodulators convert the polar coordinates of the pointing error into rectangular coordinates of the error. The amount of the DC signal represents the magnitude of the error in either elevation or azimuth and the sign plus or minus gives the direction of such error. The varying DC signals from the demodulators 30 and 31 are used to direct the missile to the target.

Since the modulating frequency of the oscillator 24 is higher than the bandwidth of the input filter amplifiers 19, 20 and 21, the radar receiver is immune to scan modulation jamming. By placing the narrow band filters ahead of the modulation stage, any noise or clutter associated with broadband reception will not be present to cause saturation of subsequent stages. In addition, this arrangement provides for narrowband doppler tracking in the midst of multiple targets. Since the system of the present invention develops a phase modulated signal containing the pointing error information, a limiting IF amplifier 27 can be used without destroying the information and at the same time overcoming the action of any short pulse jamming.

Obviously many modifications and variations of the present invention are possible in the light of the above teachings. It is therefore to be understood that within the scope of the appended claims the invention may be practiced otherwise than as specifically described.

What is claimed is:

1. In a monopulse continuous wave radar receiving system producing azimuth and elevation RF difference signals and a RF sum signal developed from the RF signals received at a receiving antenna from a target, the amplitude variation of said azimuth RF difference signal representing the variation in the azimuth pointing error of the receiving antenna, the amplitude variation of said elevation RF difference signal representing the variation in the elevation pointing error of the receiving antenna;

a modulating means for accepting an IF difference signal derived from an RF difference signal;

a modulating oscillator connected to said modulating means for supplying a first modulating signal for said IF difference signal and a second modulating signal for producing a double sideband suppressed carrier modulation of said IF difference signal whose variation in amplitude represents the variation in a pointing error of the receiving antenna, said suppressed carrier modulation signal of said IF difference signal being in quadrature with an IF sum signal derived from the sum RF signal;

summing means accepting an IF sum signal of the sum RF signal and connected to said modulating means, said summing means adding to said IF sum signal, said suppressed carrier modulation signal from said modulating means in quadrature thereto establishing a phase modulated composite signal whose variation in phase represents the variation in a pointing error;

filtering means being connected to said summing means for selecting the sum signal from said composite signal from said summing means;

comparator means connected to said summing means and to said filtering means, said comparator means accepting said composite signal, said filtering means feeding to said comparator means an IF sum signal having a 90° phase shift from said IF sum signal of said composite signal, said comparator means eliminating said IF sum signal of said composite signal and extracting from said suppressed carrier modulation signal of said composite signal an amplitude modulating signal at a frequency of said modulating oscillator whose variation in amplitude represents the variation in the pointing error of the receiving antenna from the target.

2. In a monopulse continuous radar receiving system of claim 1, a plurality of filter and amplifier means being connected before said modulating means for narrowband filtering of said IF difference signal and being connected before said summing means for narrowband filtering of said IF sum signal.

3. In a monopulse continuous radar receiving system of claim 2, a 90° phase shifter being connected to said modulating oscillator and to said modulating means for providing additionally a modulating signal having a 90° phase shift for said modulating means, said modulating means operating on IF difference signals of said azimuth and elevation RF difference signals thereby producing two suppressed carrier modulation signals of said IF difference signals in quadrature with each other and in quadrature with said IF sum signal whereby said azimuth and elevation IF difference signals are identifiable.

4. In a monopulse continuous radar receiving system of claim 3, wherein said modulating means comprises two modulators, one of said modulators connected to said modulating oscillator and to said filter and amplifier means and accepting an azimuth IF difference signal of said azimuth RF difference signal from one of said filter and amplifier means and a modulating signal from said modulating oscillator for producing a double sideband suppressed carrier modulation of said azimuth IF difference signal whose variation in amplitude represents the variation in the azimuth pointing error of a receiving antenna, the other of said modulators connected to said phase shifter and to said filter and amplifier means and accepting an elevation IF difference signal of said elevation RF difference signal from another of said filter and amplifier means and a modulating signal having a 90° phase shift from said phase shifter for producing a double sideband suppressed carrier modulation of said elevation IF difference signal whose variation in amplitude represents the variation in the elevation pointing error of the receiving antenna, whereby said IF difference signals are separable and identifiable.

5. In a monopulse continuous radar receiving system of claim 4, wherein said summing means adds said double sideband suppressed carrier modulation of said azimuth and elevation IF difference signals to said IF sum signal establishing a composite signal whose variation in phase represents the variation in the azimuth and elevation pointing errors of the receiving antenna; an a limiting IF amplifier being connected between said summing means and said filtering and comparator means whereby said composite signal can be limited in amplitude without the loss of the phase variation thereof.

6. In a monopulse continuous radar receiving system of claim 5 wherein said comparator means compares a 90° phase shifted IF sum signal from said narrowband filtering means with said composite signal from said limiting IF amplifier, said composite signal comprising an IF sum signal and suppressed carrier modulation of said azimuth and elevation IF difference signals in quadrature with each other and said IF sum signal, said comparator means having an output amplitude modulating signal at a frequency of said modulating oscillator whose variation in amplitude and phase represents the polar coordinates of the pointing error of the receiving antenna from the target.

7. In a monopulse continuous radar receiving system of claim 6, demodulator means connected to said comparator means and to said modulating oscillator and said 90° phase shifter, said demodulator means demodulating said output amplitude modulating signal of said comparator means by comparing with said modulating signals from said modulating oscillator and said phase shifter and thereby producing varying DC signals representing both azimuth and elevating pointing errors of the receiving antenna from a target.

8. In a monopulse continuous radar receiving system of claim 7, mixing means being connected, respectively, before each of said plurality of filter and amplifier means, said mixing means for receiving, respectively, a RF sum signal, an azimuth RF difference signal and an elevation RF difference signal;

a doppler tracking loop being connected to said filtering means and to each of said mixing means, said loop feeding a local oscillator signal to said mixers for heterodyning with said RF signal producing said sum IF signal, and said azimuth and elevation IF difference signals, respectively, said loop being controlled by said IF sum signal as a feedback signal from said filtering means to compensate said local oscillator signal for the doppler frequency shift within the RF sum signal and to maintain said IF signals from said mixers within the middle of the IF bandwidth of said filter and amplifier means.

* * * * *